United States Patent [19]

Brunner et al.

[11] Patent Number: 4,459,486

[45] Date of Patent: Jul. 10, 1984

[54] RADIATION MEASUREMENT INSTALLATION

[75] Inventors: Julius Brunner, Rueckersdorf; Manfred Pfeiler, Erlangen, both of Fed. Rep. of Germany

[73] Assignee: Siemens Aktiengesellschaft, Berlin and Munich, Fed. Rep. of Germany

[21] Appl. No.: 353,976

[22] Filed: Mar. 2, 1982

[30] Foreign Application Priority Data

Mar. 20, 1981 [DE] Fed. Rep. of Germany ....... 3111058

[51] Int. Cl.$^3$ ............................................. G01T 1/20
[52] U.S. Cl. .................................. 250/367; 250/363 S
[58] Field of Search .................... 250/363 S, 367, 368; 378/4, 14

[56] References Cited

U.S. PATENT DOCUMENTS

| | | | |
|---|---|---|---|
| 3,967,122 | 6/1976 | Ashe et al. | 250/367 |
| 4,174,481 | 11/1979 | Liebetruth | 250/445 T |
| 4,292,538 | 9/1981 | Carlson | 250/367 |

*Primary Examiner*—Janice A. Howell
*Attorney, Agent, or Firm*—Hill, Van Santen, Steadman & Simpson

[57] ABSTRACT

In an exemplary embodiment, a radiation source emits a fan-shaped beam of rays, and a radiation receiver has a row of photoelectric transducers. Before each photoelectric transducer at least three like scintillation crystals are arranged in the row which are separated from one another by thin, opaque layers. Between each photoelectric transducer and the associated scintillation crystals, a medium is arranged which has a light transmission decreasing from the center of the respective photoelectric transducer in the direction of the outer edges of said transducer.

1 Claim, 2 Drawing Figures

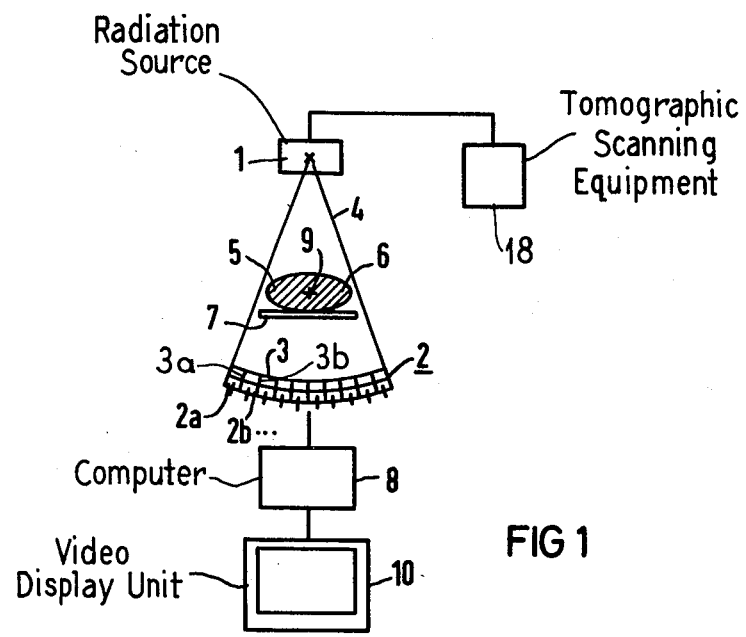
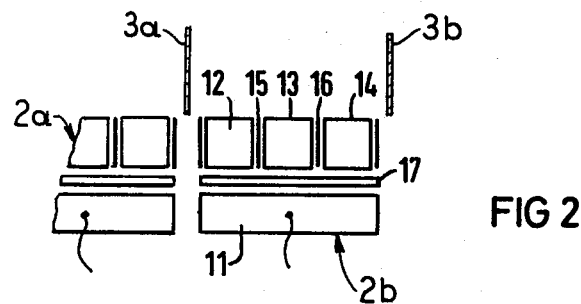

RADIATION MEASUREMENT INSTALLATION

BACKGROUND OF THE INVENTION

The invention relates to a radiation measurement installation, comprising a radiation source, which emits a fan-shaped beam of rays, and a radiation receiver, which exhibits a series of photoelectric transducers before which a scintillation crystal arrangement is disposed.

A radiation measurement arrangement of this type is e.g. employed in a computer tomograph and serves the purpose of scanning a transverse layer of a radiography subject from different projections. A computer determines, from the output signals of the transducers at the various projections, the attenuation coefficients of image points arranged in a matrix. The computed attenuation coefficients can then be reproduced on a video unit as an image of the scanned transverse layer.

It is also known to scan a patient, who is lying between the radiation source and the radiation receiver, in that a relative movement in the longitudinal direction of a patient support takes place between said patient and the radiation measurement installation. In this manner, it is possible to construct an x-ray shadow image in line-by-line fashion.

In the case of radiation measurement installations of the type initially cited, it is known, for the purpose of influencing the spatial resolution in the longitudinal direction of the detector row forming the radiation receiver to provide adjustable diaphragms by means of which the effective length of a detector can be altered. In so doing, the x-ray quanta striking the diaphragm, however, do not contribute to the detector signal; but they do contribute to the dose which is supplied to the patient.

SUMMARY OF THE INVENTION

The object underlying the invention resides in producing a radiation measurement installation of the type initially cited which exhibits a high spatial resolution with a favorable signal-to-noise ratio.

In accordance with the invention this object is achieved in that, for each photoelectric transducer, at least three like scintillation crystals are arranged in the row, which are separated from one another by thin opaque layers, and that a medium is arranged between each photoelectric transducer and the scintillation crystals associated with it, which medium has a light transmission decreasing from the center of the respective photoelectric transducer to the margin of this transducer. In the case of the inventive radiation measurement installation, all x-ray quanta arriving in the region of a detector, comprised of a scintillation crystal arrangement and photoelectric transducer, also contribute to the detector signal. The spatial resolution is thus substantially increased in comparison with the instance in which, given the same detector length, only one scintillation crystal for a photoelectric transducer is present, while at the same time the signal-to-noise ratio is virtually not impaired.

The invention shall be explained in greater detail in the folllowing on the basis of an exemplary embodiment illustrated on the accompanying drawing sheet; and other objects, features and advantages will be apparent from this detailed disclosure and from the appended claims.

BRIEF DESCRIPTION OF THE DRAWINGS

FIG. 1 is an illustration of a radiation measurement installation in which the inventive idea is applied; and FIG. 2 is an enlarged illustration of a detector element of the radiation measurement installation according to FIG. 1.

DETAILED DESCRIPTION

In FIG. 1, as the radiation source, an x-ray tube 1 is illustrated which, with a radiation receiver 2, forms a radiation measurement installation. The radiation receiver 2 exhibits a row of detector elements 2a, 2b, etc., before which a collimator 3 is arranged whose leaves are aligned to the focus of the x-ray tube 1. The x-ray tube 1 is fixedly connected with the radiation receiver 2 via a rotary frame. The x-ray tube 1 emits a fan-shaped x-ray beam 4 whose extent in the plane of the transverse layer 5—to be examined—of a patient 6, lying on a support 7, is so great that the entire layer 5 to be examined is permeated by x-radiation. Perpendicularly to the layer 5 the extent of the x-ray beam 4 corresponds to the layer thickness. The number of detector elements 2a, 2b, etc. of the radiation receiver 2 is selected corresponding to the desired image resolution and can amount to e.g. five hundred and twelve (512). Each detector element supplies a signal which corresponds to the intensity of the received x-radiation.

The detector elements 2a, 2b, etc. of the radiation receiver 2 are connected to a computer 8 which, from the output signals which are formed during the rotation of the measurement signals 1, 2, through an angle of 360° about the rotational axis 9, calculates the attenuation values of specific image points of the layer 5, and hence an image of the irradiated layer 5 of the patient 6. This image is reproduced on a video unit 10.

The x-ray tube 1 can be pulse-driven during a scanning operation such that, for example, per angular degree, one set of output signals of the radiation receiver 2 is generated. In this manner, for example, 360×512 output signals are generated. In the example, for the purpose of clarity, not all detector elements are shown, but only a small number is shown.

In FIG. 2, one of the detector elements 2a, 2b, etc., is illustrated for example 2b. The detector element includes a respective individual photoelectric transducer 11, for example, a photodiode which supplies the detector output signal. Viewed in the radiation direction before the photoelectric transducer 11, a row of three like scintillation crystals 12, 13, 14 is arranged. The scintillation crystals of all detector elements 2a, 2b, etc. form an elongated row in the radiation receiver 2. The scintillation crystals 12, 13, 14 are separated from one another by thin, opaque layers 15, 16. Between the photoelectric transducer 11 and the scintillation crystals 12, 13, 14, associated with the latter, a medium 17 is arranged which has a light transmission decreasing from the center of the respective photoelectric transducer toward the edge of this transducer. This medium can, for example, be a sheet with varying attenuation over its longitudinal extent.

With regard to the local resolution it must be noted that the x-radiation striking a detector element in the center region contributes substantially more to the output signal than the x-radiation striking in the lateral regions. Thus, an increased local resolution of the entire detector row results as compared with the instance in which, given the same width of a detector element, only one scintillation crystal is present without the medium 17.

Regarding the signal-to-noise ratio, the following applies: If one designates with $S_n$ the signal contribution of the partial crystal n (n=0; center crystal; n=±1 following crystals, etc. to n=±z), when one x-ray quantum is absorbed in this crystal, one then obtains for N, in azimuth direction, x-ray quanta uniformly distributed over the entire crystal (with $S_n = S_{-n}$), obtaining a signal $$S = \frac{N}{2z+1} \sum_{n=-z}^{z} S_n$$

with a standard deviation $$S = \sqrt{\frac{N}{2z+1} \sum_{n=-z}^{z} S_n^2}$$

For $S_n = S_{-n}$ and $S_0 > S_1 > S_2 \ldots > S_z$ the sensitivity profile of the detector element drops in the azimuthal direction (increased definition).

The quotient of signal and noise is $$\frac{S}{\Delta S} = \sqrt{N} \cdot \frac{1}{\sqrt{2z+1}} \cdot \frac{\sum_{n=-z}^{z} S_n}{\sqrt{\sum_{n=-z}^{z} S_n^2}} \left(\frac{S}{\Delta S}\right)_{max.} = \sqrt{N}$$

results for a homogeneous crystal (z=0). With z=1 and $S_{-1} = S_1 = \frac{1}{3}S_0$ one obtains e.g., $$\frac{S}{\Delta S} = \sqrt{N} \cdot 0.87;$$

i.e., a substantially higher value than through aperture narrowing $$\left(S_{-1} = S_1 = 0 \longrightarrow \frac{S}{\Delta S} = \frac{\sqrt{N}}{\sqrt{3}} = 0.58 \sqrt{N}\right).$$

It will be apparent that many modifications and variations may be effected without departing from the scope of the novel concepts and teachings of the present invention.

SUPPLEMENTARY DISCUSSION

An example of the prior art is found in German Pat. No. 28 14 242, and this patent is incorporated herein by reference in its entirety by way of background.

As indicated in FIGS. 1 and 2 of the present drawings, the successive detector elements such as 2a, 2b, may be arranged along an arcuate path, so that the centers of the successive detectors are equidistant from the focus of x-ray tube 1. Wall portions 3a and 3b of the collimator 3 are indicated in FIG. 2 which are located in radial planes intersecting the focus of x-ray tube 1. Other portions of the collimator 3 may define with the radial walls such as 3a, 3b respective compartments corresponding in cross section to the overall radiation-receiving surface of the individual detectors such as 2a, 2b.

The light energy emitted by the crystals of each detector such as 12, 13, 14, FIG. 2, is transmitted by the medium 17 so as to impinge on the junction region of the photodiode 11. By way of example, the central region of medium 17 aligned with the undersurface of center crystal 13 may be essentially 100% transmissive of the optical output of crystal 13, while the outer regions of medium 17 aligned with the undersurfaces of outer crystals 12 and 14 may be 30% transmissive of the optical output of these crystals 12 and 14. The optically opaque layers such as 15 and 16 prevent optical coupling between successive crystals of the series of crystals forming the radiation receiver 2. Tomographic scanning equipment is indicated at 18 in FIG. 1 for supplying high voltage pulses to the x-ray tube 1 during rotation of the measuring arrangement 1, 2 about rotational axis 9.

As in the foregoing example, the medium 17 preferably has very high light transmissiveness over the extent of the medium 17 aligned with the central part of the series of crystals of each detector, the light transmissiveness of medium 17 decreasing for crystals or portions of crystals progressively more remote from the central part of the detector. The light transmissiveness of medium 17 is preferably uniform with respect to a lateral direction which extends at right angles to the plane of FIG. 2. Thus each segment of medium 17 may have a uniform value of light transmissiveness in the lateral direction corresponding to the thickness of layer 5 in FIG. 1. On the other hand, the light transmissiveness of segments of medium 17 progressively further away from the center segment in the direction along the row of crystals may have progressively decreasing light transmissiveness. In the example previously given the central segment having a length dimension to underlie the entire length of central crystal 13 may have a uniform high value of light transmissiveness while the outer segments of medium 17 having lengths so as to underlie the entire lengths of crystals 12 and 14 may have a uniform but substantially lower value of light transmissiveness. For the case of five crystals per detector, the outermost segments of medium 17 underlying the outermost crystals may have uniform but still lower values of light transmissiveness. Thus, the sensitivity profile of each detector element, for the example of five crystals per detector, will correspond to the case Z=2, and $S_0 > S_1 > S_2$, having reference to the mathematical notation utilized in the present specification.

The light sensitive junction region of each photodiode may have a length dimension substantially corresponding to the length of the associated detector so that a light quanta from each crystal as transmitted by medium 17 has substantially an equal effect on the output of the associated detector.

We claim as our invention:

1. A radiation measurement installation comprising a radiation source which emits a fan-shaped beam of rays, and a radiation receiver having a series of photoelectric transducers, and having a scintillation crystal arrangement disposed in front of said series of photoelectric transducers in optical coupling relationship therewith, said scintillation crystal arrangement comprising a group of at least three like scintillation crystals arranged in a row in front of each photoelectric transducer, opaque layers separating the scintillation crystals of each group and having a thickness which is small in comparison to the corresponding dimension of said scintillation crystals, and a medium arranged between each photoelectric transducer and the group of scintillation crystals arranged in front of such photoelectric transducer, said medium having a light transmission decreasing from the center of the respective photoelectric transducer in the direction of the edge of this transducer.

* * * * *